United States Patent [19]

Honjo et al.

[11] Patent Number: 4,723,772
[45] Date of Patent: Feb. 9, 1988

[54] ORIGINAL HANDLING APPARATUS

[75] Inventors: Takeshi Honjo, Kawasaki; Naomi Takahata, Yokohama, both of Japan

[73] Assignee: Canon Kabushiki Kaisha, Tokyo, Japan

[21] Appl. No.: 777,020

[22] Filed: Sep. 17, 1985

[30] Foreign Application Priority Data

Sep. 22, 1984 [JP] Japan .................. 59-199273
Sep. 22, 1984 [JP] Japan .................. 59-199274
Sep. 22, 1984 [JP] Japan .................. 59-199275

[51] Int. Cl.⁴ ............................ B65H 5/02
[52] U.S. Cl. .......................... 271/3.1; 271/35
[58] Field of Search .......... 271/3, 3.1, 4, 186, 271/110, 111, 35; 414/100, 37; 355/35 H, 143 H

[56] References Cited

U.S. PATENT DOCUMENTS

| 3,889,942 | 6/1975 | Robnolte | 271/3 |
| 4,164,347 | 8/1979 | McGrain | 271/3.1 |
| 4,231,562 | 11/1980 | Hori | 271/3.1 |
| 4,469,320 | 9/1984 | Wenthe | 271/3.1 X |
| 4,480,824 | 11/1984 | Acquaviva | 271/3.1 |
| 4,508,447 | 4/1985 | Doery | 271/3.1 X |
| 4,544,148 | 10/1985 | Kitajima et al. | 271/3.1 |
| 4,579,327 | 4/1986 | Furuichi | 271/3.1 |

FOREIGN PATENT DOCUMENTS 61240 5/1981 Japan .................. 271/110

Primary Examiner—Richard A. Schacher
Attorney, Agent, or Firm—Fitzpatrick, Cella, Harper & Scinto

[57] ABSTRACT

An original handling apparatus has an original table for stacking originals thereon, rollers and belts for feeding each original to an exposure position, a partition arm set on the originals on the tables and detected when all the originals on the table are exposed once, and a CPU for controlling the operation of the overall apparatus. The originals can be reliably fed, exposed and returned.

8 Claims, 17 Drawing Figures

ORIGINAL HANDLING APPARATUS

BACKGROUND OF THE INVENTION

1. Field of the Invention

The present invention relates to an original handling apparatus for separating and feeding each original from an original table to an exposure position and for outputting the exposed original from the exposure position.

2. Description of the Prior Art

In a conventional original circulation apparatus as one type of original handling apparatus, a bundle of originals to be fed are placed on an original table, and sequentially fed one by one from the uppermost or lowermost sheet by a friction pickup means arranged at the feed end side of the bundle of originals. A fed original is conveyed to a predetermined position on a platen glass, and the exposed original is returned to the original table and stacked on the unexposed originals.

In this type of apparatus, it is difficult to reliably feed original sheets one by one by the friction pickup means. When a large number of originals are stacked, no original may be fed or two or more sheets may be fed causing double or triple feed. In order to prevent this, the operator is warned not to stack originals exceeding a predetermined number (regulation number) of sheets. Thus, if the operator accidentally stacks originals exceeding this predetermined number (regulation number), the above trouble occurs and the originals may be damaged.

Moreover, when the number of stacked originals increases, the weight also increases and may cause damage to the original table.

In this type of apparatus, a circulation structure is frequently adopted. In this structure, a partition arm is placed on a bundle of originals to be picked up and fed. Output originals are sequentially stacked on the arm. When the final original is fed, the partition arm drops by its own weight. One cycle of originals is confirmed by a signal from a means for detecting the dropped arm.

When the final sheet is fed, the partition arm drops by its own weight and the dropped arm is detected to determine one cycle of originals. Thus, if the arm does not fall due to malfunction, the apparatus cannot confirm one cycle of originals and continues to operate.

In addition, originals to be handled by this type of apparatus have various sizes, e.g., B5, A4 and the like. For this reason, each time the original size is changed, the operator must move an original guide mounted on the original table in accordance with the original size. Normal original feeding can be performed only when the original guide is moved to an optimal position. However, in practice, the operator may not adjust the original guide at the optimal position before setting the originals. Then, inclined feeding or defective pickup of originals may occur. When a means for detecting such improper operation before original feed begins is incorporated, the overall mechanism becomes complex.

SUMMARY OF THE INVENTION

The present invention has been made in consideration of this and has as its object to provide an improved original handling apparatus.

It is another object of the present invention to provide an original handling apparatus which has a simple construction and high reliability.

It is still another object of the present invention to provide an original handling apparatus which prevents separation or feeding failure of originals and damage to originals.

It is still another object of the present invention to provide an original handling apparatus which can recognize an operation error of the apparatus and prevent original feed failure.

The above and other objects and features of the present invention will become apparent from the following description when taken in conjunction with the accompanying drawings and the appended claims.

BRIEF DESCRIPTION OF THE DRAWINGS

FIGS. 10-1 to 10-4 are diagrams showing circulation count devices.

DETAILED DESCRIPTION OF THE PREFERRED EMBODIMENTS

A preferred embodiment of the present invention will be described with reference to the accompanying drawings.

Figure 1:
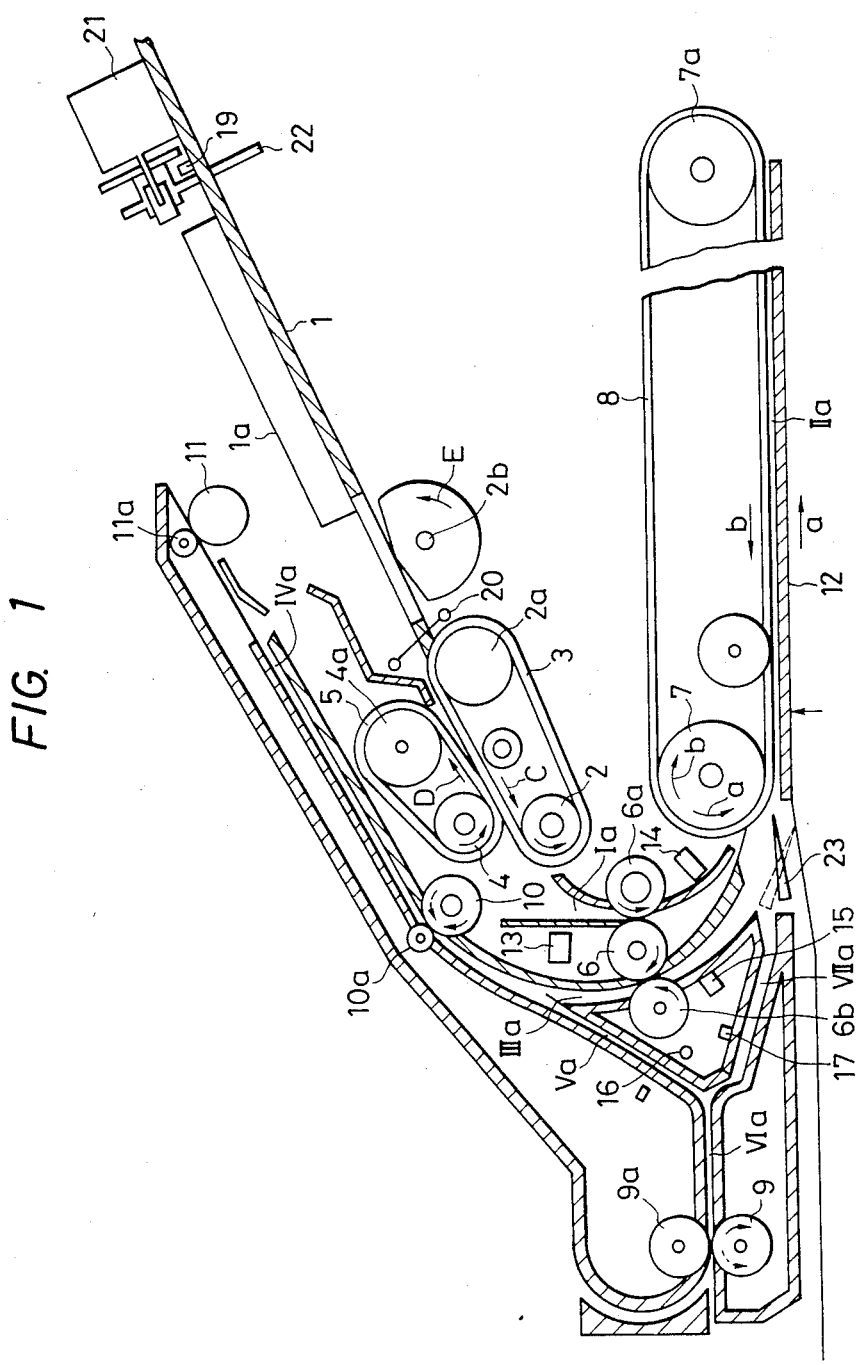
FIG. 1 is a longitudinal sectional view of an original circulation apparatus according to an embodiment of the present invention.

FIG. 1 is a longitudinal sectional view showing the schematic construction of a double side copy original circulation apparatus according to an embodiment of the present invention.

A plurality of originals are stacked on an original table 1. A paper feed belt 3 is looped around a paper feed belt driving shaft 2 and a paper feed belt driven shaft 2a and is driven in a direction indicated by arrow C. A separation belt 5 is looped around a separation belt driving shaft 4 and a separation belt driven shaft 4a and is driven in a direction indicated by arrow D. A woodruff roller 2b is driven in a direction indicated by arrow E. The originals stacked on the original table 1 are sequentially picked up from the lowermost one by the paper feed belt 3, the separation belt 5 and the roller 2b. Rollers 6a and 6b are urged against a carrier roller 6. Rollers 9a, 10a and 11a are urged against carrier rollers 9, 10 and 11, respectively. A convey belt driving roller 7 is mounted at the left side of a glass platen 12 on the upper side of the copying machine main body. A convey belt driven roller 7a is located at the right side of the glass platen 12. A belt 8 is looped around the rollers 7 and 7a.

The lower surface of the belt 8 is in close proximity or in contact with the upper surface of the glass platen 12. Reflection-type optical sensors 13 to 17 for detecting the leading or trailing edge of each original are mounted at prescribed positions in an original circulation path (paper path). A reflection sensor (ES) 20 serves to detect an original placed on the original table 1. A reflection sensor (recycle sensor: RS) 19 serves to detect one circulation of originals. When a partition arm 22 driven by a recycle motor 21 is stopped by the originals, the recycle sensor (RS) 19 is turned on. When originals are fed from the lowermost original and the final original is removed from the arm 22, the partition arm 22 drops through the position of the recycle sensor (RS) 19 by its own weight and the sensor 19 is turned off.

Figure 2:
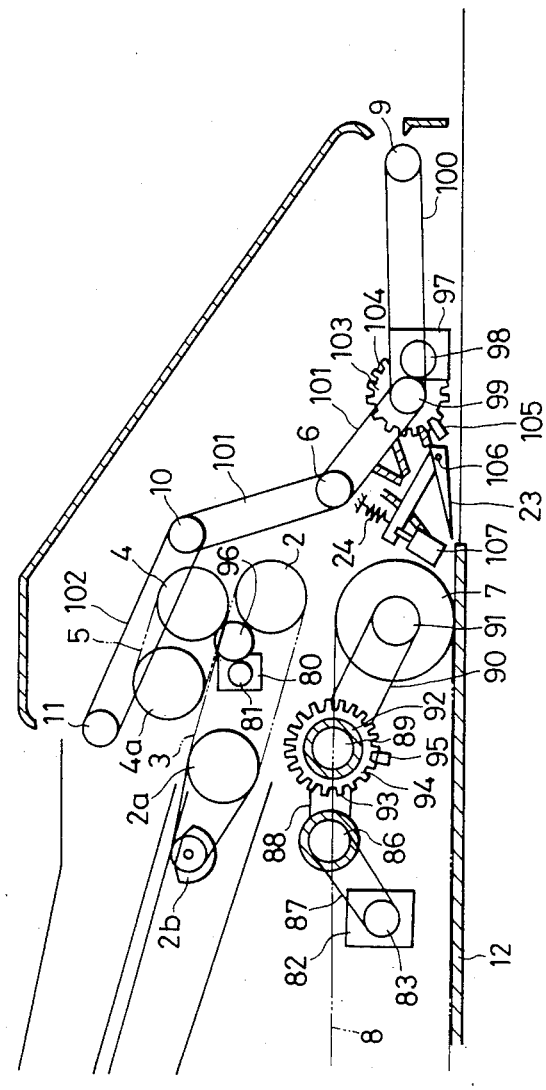
FIG. 2 is a rear sectional view showing a drive section of the original circulation apparatus.

FIG. 2 is a rear sectional view of the drive section of the apparatus. The drive section includes a motor (M2) 80, a motor gear 81 for transmitting a driving force to the shafts 2 and 4 and the roller 2b through a gear 96, a motor (M1) 82, a motor pulley 83, a two-step pulley 86 for transmitting a driving force from a belt 87 to a belt 88, a two-step pulley 89 formed integrally with the pulley 86 for transmitting a driving force from the belt 88 to a belt 90 so as to constantly transmit a driving force to the driving roller 7 of the convey belt 8 through a pulley 91, a disk 93 having slits 94 and rotated together with the pulley 89, and an electromagnetic brake (BK) 92. The disk 93 allows detection of the movement amount of the belt 8 together with a photoelectric sensor 95. When the electromagnetic brake 92 is turned on, the belt 8 can be immediately stopped.

The drive section further includes a motor (M3) 97, a gear 98, a pulley 99, and belts 100, 101 and 102 for transmitting a driving force to the carrier rollers 6, 9, 10 and 11. A disk 103 has slits 104 and is driven together with the pulley 99. The disk 103 can detect the angle of rotation of the rollers 6, 9, 10 and 11 by a photo-electric sensor 105, i.e., the feed amount of an original. A selector 23 selects the feeding direction of an original about a pivot shaft 106 by a tension spring 24 and a solenoid (SL) 107 between a direction for feeding the original on the glass platen 12 to the carrier roller 6 and a direction for feeding the original from the carrier roller 9 onto the glass platen.

The operation of the double side original circulation apparatus will be described below.

(i) One sided Original Copy

Referring to FIG. 1, a plurality of one side originals sorted in a proper order are stacked on the original table 1 with the first page facing upward. The originals stacked on the original table 1 are sequentially picked up one by one from the lowermost one by the paper feed belt 3 and the separation belt 5. The fed original is fed via a paper path Ia onto the glass platen 12 by the convey belt 8 with the image surface of the original facing downward. When the trailing edge of the original is detected by the sensor (S2) 14, counting of the number of slits 94 of the disk 93 (FIG. 2) is started. After a predetermined number of slits 94 are counted, the motor (M1) 82 is turned off and the electromagnetic brake (BK) 92 is turned on so that driving of the convey belt 8 is immediately stopped. Thus, the original is automatically located at a predetermined position on the glass platen 12.

When the original is positioned on the glass platen 12 in this manner, the copy operation is started and one exposure scan is performed. The copied sheet is output to a proper output tray (not shown). After image exposure, the solenoid (SL) 107 is turned on and the selector 23 is set in the position illustrated by the broken line. The exposed original is output through paper paths IIIa and IVa. During this operation, the next original is fed and is positioned on the glass platen 12 in parallel processing.

This parallel processing performs simple simple original circulation operation and reversal of an original during this processing is not performed for the previous or next original. Therefore, parallel processing will be called a regular output/regular feed operation. The regular output/regular feed operation is sequentially performed. When one circulation of originals is detected by the recycle sensor (RS) 19, an end of circulation is signalled to the copying machine main body and the number of copied sheets for each original is counted. The above operation is repeated until a preset number of sheets for each original are obtained. A required number of sheets for each original are stored in the output tray (not shown) the copying machine.

(ii) Double Side Original Copy

Figure 3:
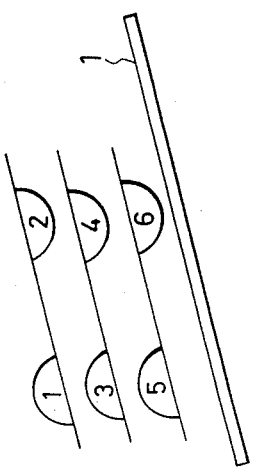
FIG. 3 is a diagram for explaining the stacked state of originals.

Assuming three double sides originals are to be stacked on the original table 1, they are stacked on the table 1 in the order shown in FIG. 3. The stacked order of originals on the table after the copy operation is the same as the initially set order shown in FIG. 3. The operation to achieve this will be described below.

The original having pages 5 and 6 is fed onto the glass platen 12, the motor (M1) 82 is driven in the reverse direction, the motor (M3) 97 is driven in the normal direction (FIG. 2), and the solenoid (SL) 107 is turned on. Then, the selector 23 is set in the position indicated by the broken line. The original is passed through the paths IIIa and IVa, clamped by the rollers 6, 6a, 10, 10a, 11 and 11a, and carried thereby. When the sensor (S3) 15 detects the trailing edge of the original, the motor (M3) 97 is stopped. After a predetermined period of time thereafter, the motor (M3) 97 is reversed. Thus, the original is fed through paper paths Va and VIa and is carried by the carrier rollers 9 and 9a. When the sensor S4 (16) detects the trailing edge of the original, the motor (M3) 97 is stopped. After a predetermined period of time thereafter, the motor (M3) 97 is driven in the forward direction and the solenoid (SL) 107 is turned off. The original is passed through a paper path VIIa, clamped by the belt 8 and carried thereby. When the trailing edge of the original is detected by the sensor (S5) 17, counting of the slits 94 of the disk 93 (FIG. 2) is started. When a predetermined number of slits 94 are counted, the motor (M1) 82 is turned off, the electromagnetic brake (BK) 92 is turned on, and the driving operation of the convey belt 8 is immediately stopped, thereby positioning the original. In this manner, the original feeding operation for reversing the original on the original table 1 and setting it on the glass platen 12, i.e. reverse paper feed operation (to be referred to as reverse feed operation hereinafter) is performed first.

The copying machine main body starts the copy operation of page 6 of the original; the first exposure scan is started and the copied sheet is output to the paper output tray (not shown). After exposure, the original is set on the glass platen 12 with the page 5 facing downward (reversed) through the paper paths IIIa, IVa, Va, VIa, and VIIa (to be referred to as reverse operation hereinafter).

The copying machine starts the copy operation of the page 5 of the original, and the copied sheet is output to the paper output tray (not shown).

After exposure of page 5, the original on the glass platen 12 is output by the carrier rollers 11 and 11a through the paper paths IIIa and IVa such that the original is output onto the remaining originals on the original table 1 with the page 5 facing upward (this operation will be referred to as regular output operation hereinafter). From a predetermined timing during this regular output operation, the original of pages 3 and 4 begins to be fed parallel to the regular output operation of the original of pages 5 and 6. The original of pages 3 and 4 is set on the glass platen 12 with the page 4 facing downward (parallel processing of the regular output operation of the previous original and reverse feed operation of the next original will be referred to as regular output/reverse feed operation hereinafter). Copy operations as described above are performed a required number of times, and the copied sheets are sorted and output to the paper output tray (not shown). At the same time, the originals are output onto the original table 1 in the same order as in the initially set state shown in FIG. 3. Double side copy operation is thus completed.

Figure 4:
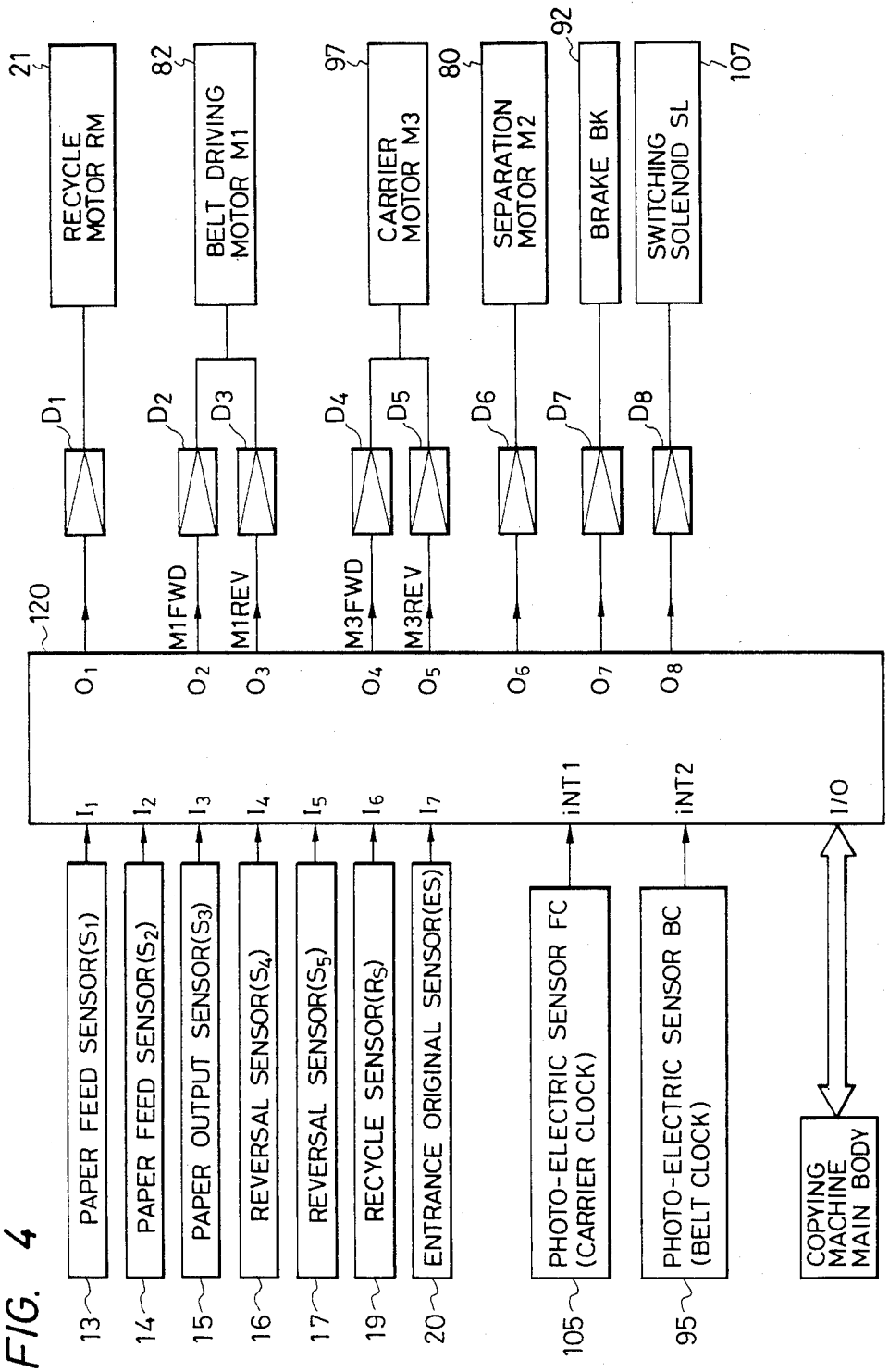
FIG. 4 is a block diagram showing a control section of the original circulation apparatus.

FIG. 4 is a block diagram of a control circuit for performing the sequence operation as described above.

Referring to FIG. 4, the circuit includes a conventional one-chip microcomputer 120 including ROMs and RAMs. Input ports I1 to I7 of the microcomputer 120 receive respective sensor outputs. Interrupt terminals iNT1 and iNT2 of the microcomputer 120 receive a carrier clock from the photo-electric sensor (FC) 105 and a belt clock from the photo-electric sensor (BC) 95, respectively.

Drivers D1 to D8 are respectively connected to output ports 01 to 08 of the microcomputer 120 so as to drive respective loads through these drivers. The microcomputer 120 produces through the output ports 04 and 05 signals M3FWD and M3REV for driving the motor (M3) 97 in the forward and reverse directions, i.e., in directions indicated by solid and broken arrows in FIG. 1. The microcomputer 120 produces through the output ports 02 and 03 signals M1FWD and M1REV for driving the motor (M1) 82 in the forward and reverse directions indicated by solid and broken arrows in FIG. 1, respectively.

The microcomputer 120 drives the recycle motor (RM) 21 through the driver D1.

The I/O terminal of the microcomputer 120 is connected to the copying machine main body so as to exchange the copy operation start signal, the original exposure end signal, one circulation start signal and the like. Thus operation of the double side original circulation apparatus and the copying machine main body is matched. Retrieval of the input signals and ON/OFF of the loads is controlled in accordance with a program stored in the ROM of the microcomputer 120.

The mode of operation of the double side original circulation apparatus (to be referred to as an RDF hereinafter) of the present invention will be described with reference to the general flow charts in FIGS. 5 and 6 and the detailed flow charts in FIGS. 7 to 9.

Figure 5:
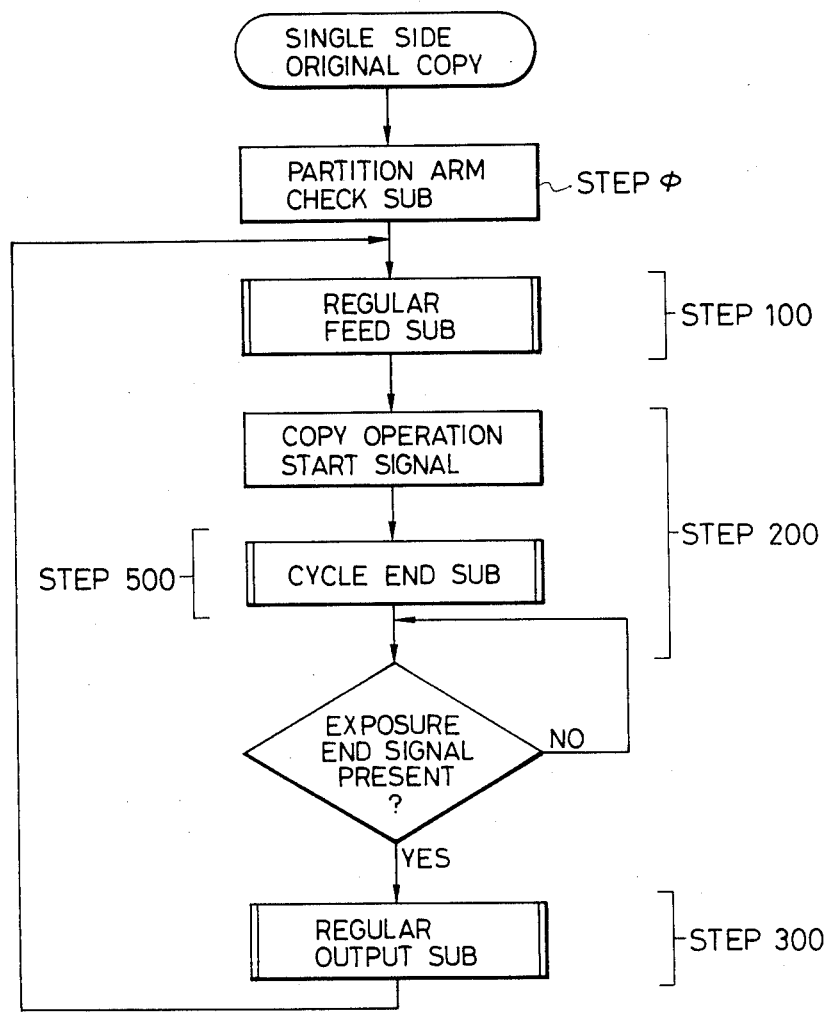
FIGS. 5 and 6 are general flow charts showing the control sequence of the oringinal circulation apparatus.
Figure 6:
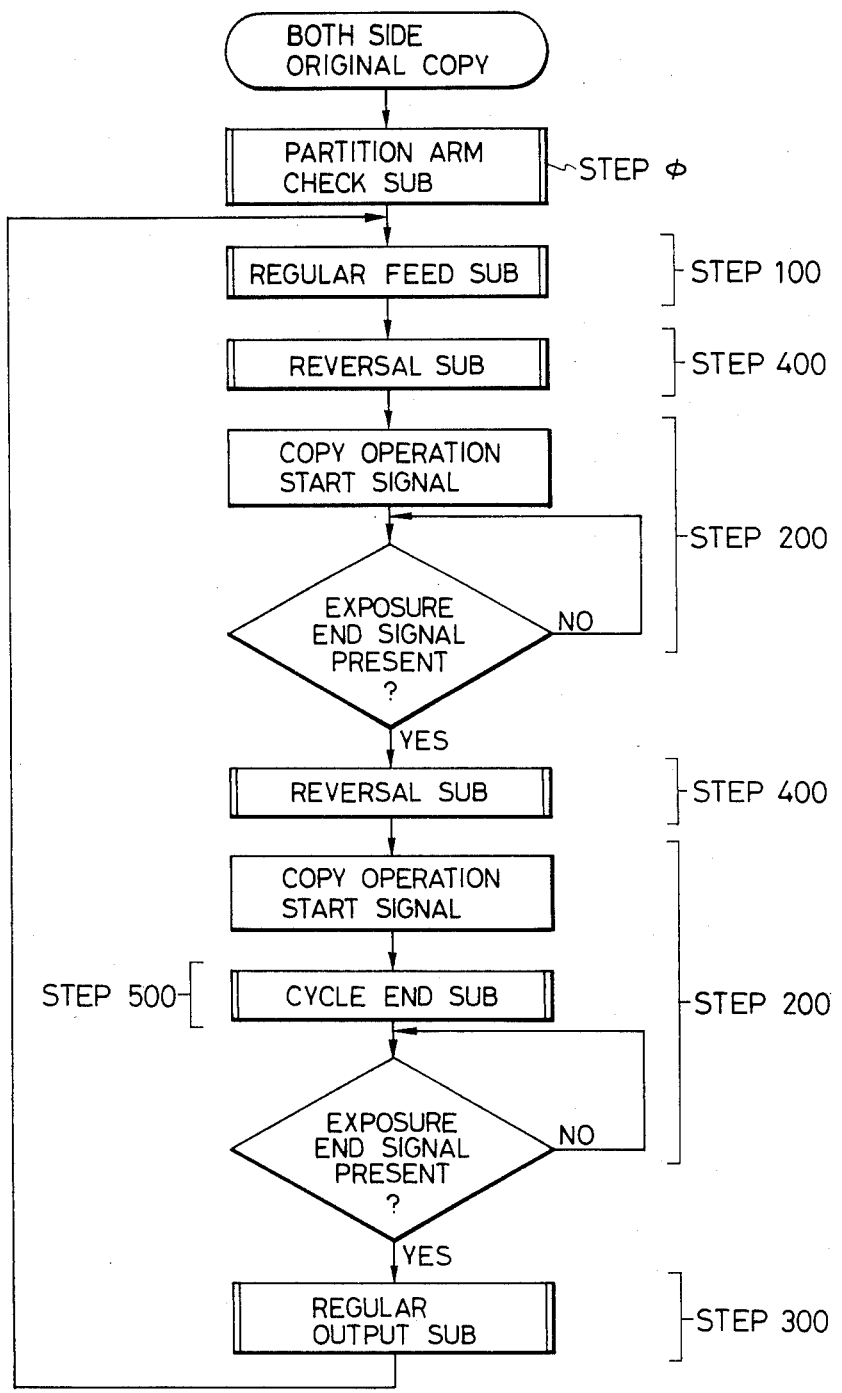
Figure 7:
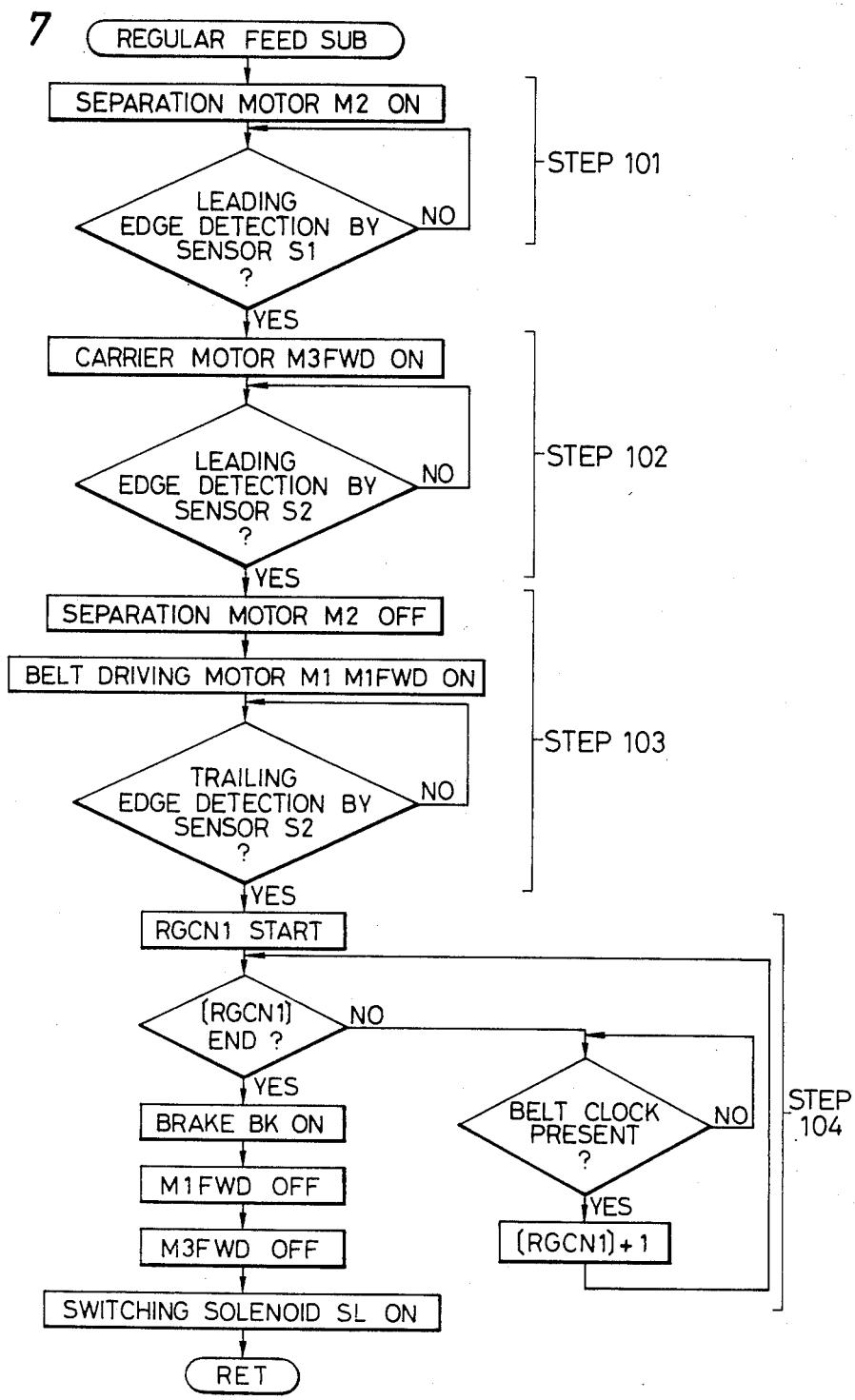
FIGS. 7 to 9 and 11 to 13 are detailed flow charts showing details of the flow charts shown in FIGS. 5 and 6.

FIG. 5 is a general flow chart for single side original copy operation, and FIG. 6 is a general flow chart for double side original copy operation. Referring to FIG. 5, in the single side original copy, the partition arm check SUB (step φ) is executed. After the partition arm 22 is pivotally stopped on the originals, the regular feed SUB (step 100) is executed. In step 100, one original is picked up from the originals on the original table 1, is fed and is conveyed to a predetermined position on the glass platen 12 of the copying machine through the paper paths Ia and IIa (FIG. 1). A copy operation start signal is supplied to the copying machine main body, and the copying machine main body starts the copy operation, i.e., the exposure operation. Meanwhile, the RDF executes the cycle end SUB so as to detect one circulation of originals (step 500), and waits until the copying machine main body completes exposure (step 200). When the exposure operation ends, the regular output SUB (step 300) to be described below is executed. In this subroutine, the original on the glass platen 12 is passed through the paper paths IIa, IIIa and IVa and superposed on the arm 22 on the originals on the original table 1. The above operation is repeated. In the cycle end SUB (step 500), when the partition arm 22 drops by its own weight, an end of one circulation of originals is signalled to the copying machine, the operation is completed, and a set of copied sheets is obtained at the paper output tray of the copying machine.

In the double side original copy shown in FIG. 6, the partition arm check SUB (step φ), the regular feed SUB (step 100) and the reversal SUB (step 400) are executed to feed the original on the original table 1 to a predetermined position on the glass platen 12 through the paper paths Ia, IIa, IIIa, IVa, Va, VIa, VIIa and IIa. At this time, the original is fed such that the rear side facing the original table 1 faces upward on the glass platen 12. In step 200, the copy operation of the rear side of the original is instructed. When the exposure operation for the rear side of the original is completed, the reversal SUB (step 400) is executed again to feed the original at the predetermined position on the glass platen 12 through the paper paths IIa, IIIa, IVa, Va, VIa, VIIa and IIa, such that this time the front side of the original faces the glass platen 12. In step 200, the copying machine main body is instructed to perform the copy operation of the front side of the original. The cycle end SUB for detecting one circulation of originals is performed (step 500). When the exposure operation for the front side of the original is completed, the regular output SUB (step 300) is performed. The original is returned onto the arm 22 on the table 1 in the same state as before double side copy. The above operation is repeated to complete reproduction of a set of copied sheets one circulation.

Each SUB will now be described in more detail. In the regular feed SUB shown in FIG. 7, in order to pick up the lowermost original from those stacked on the original table 1, the separation motor (M2) 80 is turned on and arrival of the leading edge of the original at the paper feed sensor (S1) 13 mounted upstream from the carrier rollers 6 and 6a (step 101) is awaited. When the leading edge of the original is detected, in order to feed the picked up original to the paper path Ia by the carrier rollers 6 and 6a, the signal M3FWD is enabled to turn on the motor (M3) 97. The carrier rollers 6 and 6a are driven in the direction indicated by the solid arrow, and detection of the leading edge of the original by the paper feed sensor (S2) 14 interposed between the carrier rollers 6 and 6a and the belt roller 7 (step 102) is awaited. When the leading edge of the original is detected, it is determined that the original has been fed normally. To prevent premature pick up of the next original, the separation motor (M2) 80 is turned off. In order to feed the original to the paper path IIa, the signal M1FWD is enabled to turn on the motor (M1) 82 to drive the belt roller 7 in the direction indicated by the solid arrow. When the leading edge of the original is fed to the belt 8, it waits until its trailing edge is detected by the paper feed sensor (S2) 14 (step 103). When the trailing edge of the original is detected by the paper feed sensor (S2) 14, in order to stop the original at the predetermined position on the glass platen 12, a register counter (RGCN1) rendered operative by the clock from the photo-electric sensor (BC) 95 is started. The counter RGCN1 is incremented each time a clock pulse is input from the photo-electric sensor 95 until the counter RGCN1 reaches a preset count (step 104). When the preset time is counted by the counter RGCN1, it is determined that the original has been fed to the predetermined position on the glass platen 12. Then, the electromagentic brake (BK) 92 is turned on and the signal M1FWD for the motor (M1) 82 is disabled. The belt is immediately stopped and the original is correctly positioned. Driving of the motor (M3) 97 is also stopped by disabling the signal M3FWD, and the solenoid (SL) 107 is turned on to select the path IIIa.

Upon this operation, one original is stopped at the predetermined position on the glass platen 12.

Figures 1, 8:
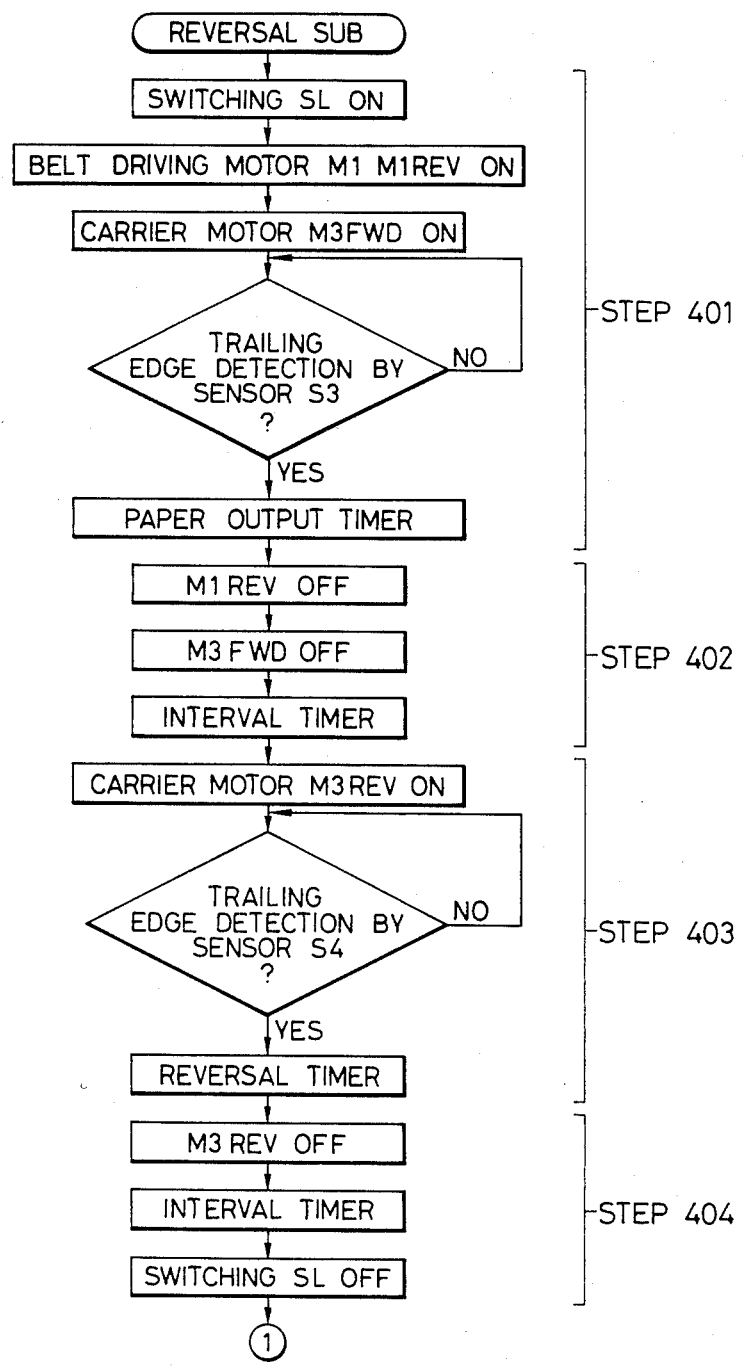
Figures 2, 8:
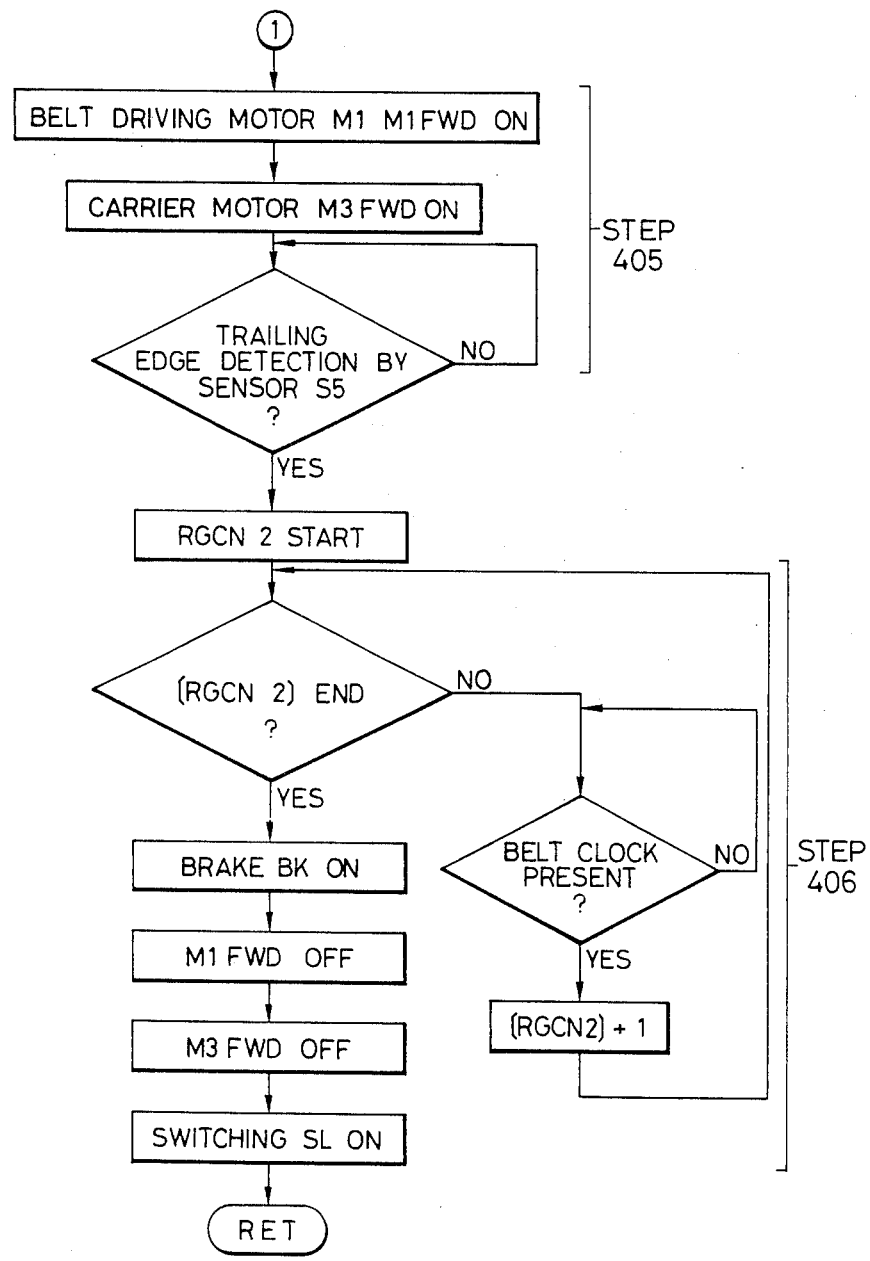

In the reversal SUB shown in FIG. 8, in order to feed the original on the glass platen 12 to the paths IIIa and IVa, the solenoid (SL) 107 is turned on to move the selector 23 downward. Then, the signal M1REV is enabled in order to rotate the belt roller 7 in the direction indicated by the broken arrow, and the signal M3FWD, i.e., the motor (M3) 97 is enabled to rotate the rollers 6 and 6a in the direction indicated by the arrows. When the original reaches the path IVa from the path IIIa, it waits until its trailing edge is detected by the sensor (S3) 15 (step 401). When the trailing edge of the original is detected, the paper output timer for counting the time until the trailing edge leaves the path IIIa is started. The signals M1REV and M3FWD are disabled to turn off the belt driving motor (M1) 82 and the carrier motor (M3) 97. The original is supported by the carrier rollers 10, 10a, 11 and 11a, and its trailing edge is at the position near the carrier rollers 10 and 10a. The original is kept in this state during the counting operation of a wait interval timer (step 402). The signal M3REV, i.e., the motor (M3) 97 is turned on so as to rotate the rollers 9, 9a, 10, 10a, 11 and 11a and reverse the feed direction of the original to the paths Va and VIa. When the original reaches the path VIa from the path Va, the original is kept feeding until the reversal sensor (S4) 16 detects the trailing edge of the original (step 403). When the trailing edge of the original is detected, a reversal timer for counting time until the trailing edge of the original passes through the path Va is started. The signal M3REV is disabled to turn off the motor (M3) 97, the original is supported by the carrier rollers 10, 10a, 11 and 11a, and the trailing edge of the original is at the position between the reversal sensor (S5) 17 and the carrier rollers 10 and 10a. The original is kept in this state until the interval timer is stopped (step 404).

The signal M3FWD is enabled to turn on the motor (M3) 97 so as to reverse the feed direction of the original to the paths VIa, VIIa and IIa and to rotate the carrier rollers 9 and 9a in the direction indicated by the solid arrow. In order to rotate the belt roller in the direction indicated by the solid arrow, the signal M1FWD is enabled to turn on the motor (M1) 82, the solenoid (SL) 107 is turned off, and the selector 23 is moved upward to switch the paper path. When the leading edge of the original is fed into the belt 8, the original waits until its trailing edge is detected by the reversal sensor (S5) 17 in the path VIIa (step 405).

When the trailing edge of the original is detected, in order to stop the original at the predetermined position on the glass platen 12, the register counter RGCN2 is started to count the clock pulses from the photo-electric sensor 95 until its ocunt reaches a preset value (step 406). When the register counter RGCN2 ends, it is determined that the original has been fed to the predetermined position on the glass platen 12. Then, the electro-magnetic brake (BK) 92 is turned on, and the belt driving motor signal M1FWD is disabled, so that the driving of the belt 8 is immediately stopped and the original is correctly positioned. The signal M3REV is disabled to stop the motor (M3) 97, and the solenoid (SL) 107 is turned off. Upon this operation, the original is reliably reversed and is stopped at the predetermined position on the glass platen 12.

Figure 9:
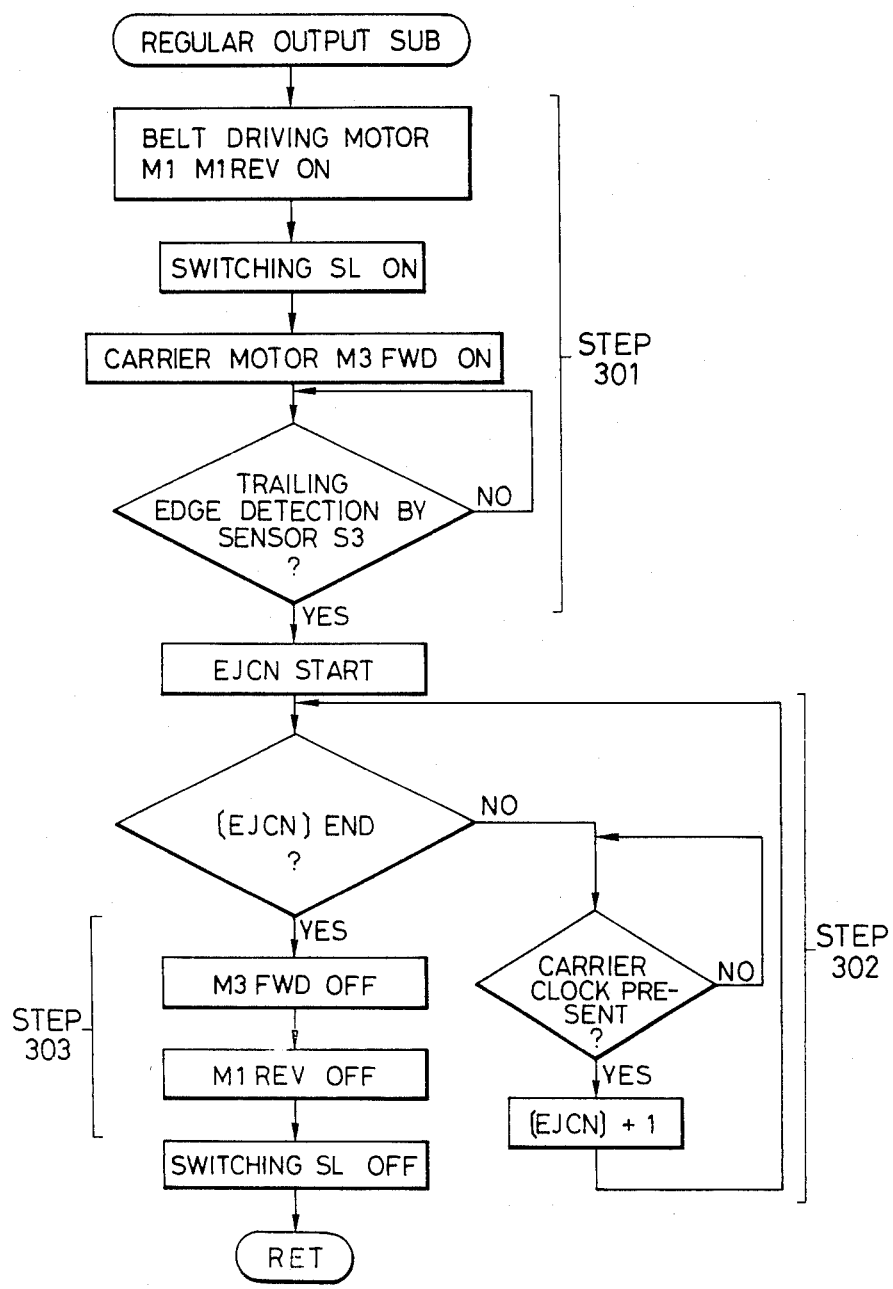

In the regular output SUB shown in FIG. 9, the signal M1REV is enabled to turn on the motor (M1) 82 so as to rotate the belt roller 7 in the direction indicated by the broken arrow and to feed the original on the glass platen 12 to the paths IIIa and IVa. The signal M3FWD is enabled to turn on the motor (M3) 97 and the solenoid (SL) 107 is turned on so as to rotate the carrier rollers 6, 6a, 10, 10a, 11 and 11a in the direction indicated by the solid arrows. When the original enters the path IVa, it waits until its trailing edge is detected by the paper output sensor (S3) 15 (step 301). When the trailing edge of the original is detected, a paper output counter EJCN is started and clocks from the photoelectric counter 105 are counted until the counter EJCN ends (step 302). When the counter EJCN ends, the original is passed between the carrier rollers 11 and 11a and returned to a position on the originals on the original table 1. The signal M1REV for the motor (M3) 97 and the solenoid (SL) 107 are turned off to complete paper output (step 303).

Figures 1, 10:
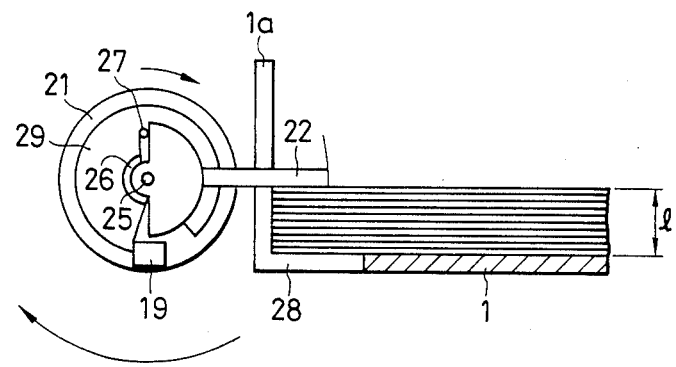
Figures 2, 10:
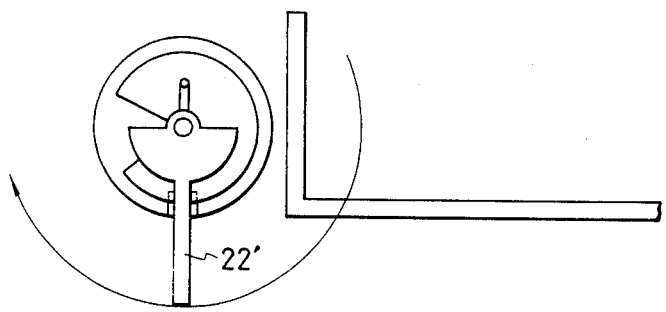
Figures 3, 10:
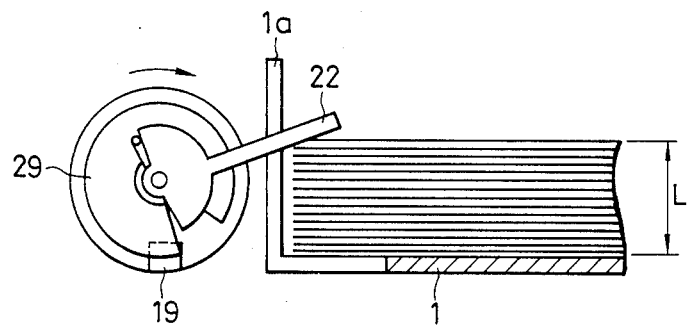
Figures 4, 10:
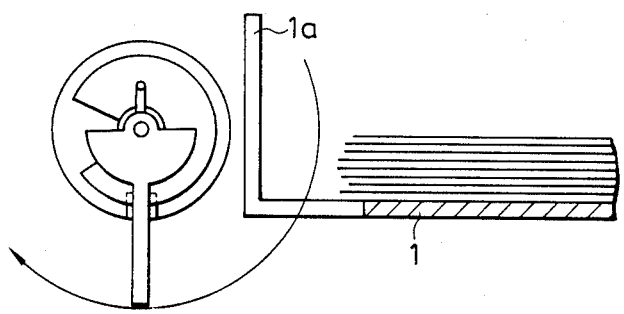
Figure 11:
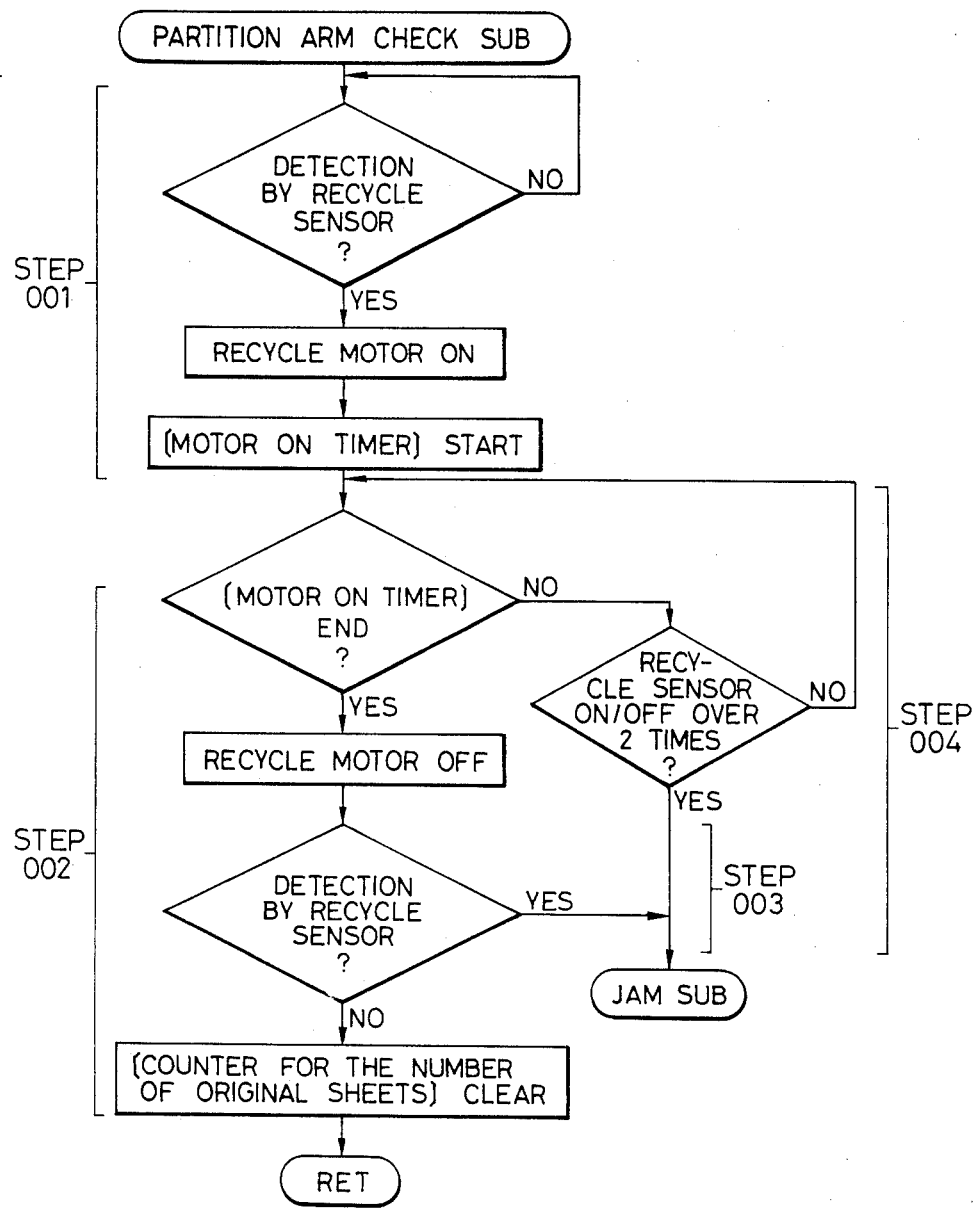
Figure 12:
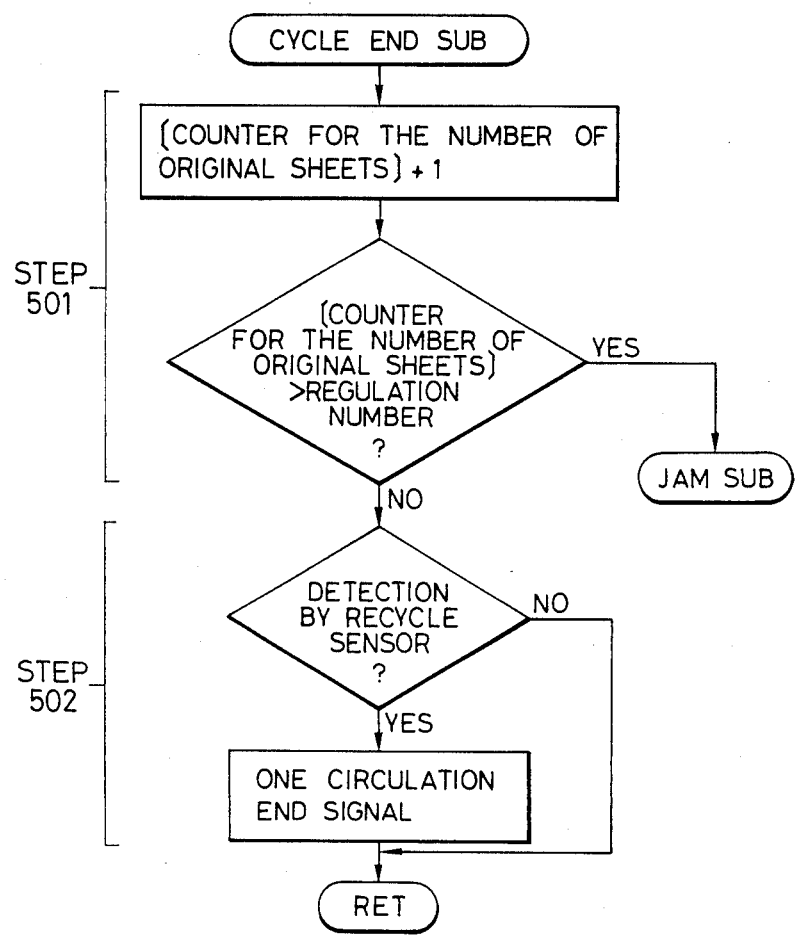

FIGS. 10-1 to 10-4 are front views showing the recycle counter devices. FIGS. 11 and 12 are detailed flow charts of the partition arm check SUB and the cycle end SUB for operating the recycle count device. Recycle count will be described with reference to FIGS. 10-1 to 10-4 and FIGS. 11 and 12.

Referring to FIG. 10-1, a shaft 25 of the recycle motor 21 is fixed to a side wall 1a of the table 1 so as to be parallel to the moving direction of the original. The motor 21 is a DC motor. A lever pin 27 is fixed to a boss 26 which is, in turn, fixed to the motor shaft 25. The partition arm 22 is in slidable contact with the motor shaft 25 and is engaged with the lever pin 27. A notch 28 for allowing pivotal movement of the arm 22 is formed at a part of the side wall 1a and the bottom of the table 1. A disk 29 with a notch is interlocked with the arm 22, and the recycle sensor (RS) 19 is turned on or off by the notch.

When there is no original on the table 1 as shown in FIG. 10-2, the arm 22 is at a position 22' indicated by the alternate two long and one short dashed line, and the recycle sensor 19 is ON. When the RDF starts operating, the partition arm check SUB is executed first. In the partition arm check SUB shown in FIG. 11, it is first checked if the recycle sensor 19 is ON so as to ascertain if the partition arm 22 is at the position 22'. The recycle motor 21 is driven in the direction indicated by the arrow in FIG. 10-1. The lever pin 27 fixed on the shaft 25 of the recycle motor 21 starts rotating in the direction indicated by the arrow and engages with the partition arm 22. Then, the partition arm 22 is rotated in the direction indicated by the arrow, and placed on the uppermost original.

The driving time of the recycle motor 21 is controlled by a motor ON timer which is started when the recycle motor 21 is driven (step 001). The time in the motor ON timer is set such that it is longer by a predetermined period of time than the rotation time (one revolution)

required for the arm 22 to be placed on the originals. Therefore, even if the partition arm 22 rebounds, the motor 21 is driven for a sufficient period of time so that the arm 22 can be urged against the uppermost original and stopped. Accordingly, the arm can be securely brought into contact with the originals.

When the arm 22 is pivotally stopped on the originals having a total thickness of 1 as shown in FIG. 10-1, the notch of the disk 29 is at the position corresponding to the recycle sensor (RS) 19. Therefore, it is determined that the arm 22 is normally positioned, an original number counter to be described is cleared, and the flow advances to the next step (step 002). However, when the operator sets originals exceeding a predetermined number (regulation number) of originals on the table 1 as shown in FIG. 10-3, a total thickness L of the originals is larger than the thickness 1. Therefore, the partition arm 22 is stopped at a level higher than that in the case of originals having the total thickness of 1. Then, the notch of the disk 29 is not at the position corresponding to the recycle sensor (RS) 19, and the recycle sensor (RS) 19 is detected to be continuously ON. In this case, it is determined that the originals are stacked exceeding a predetermined number (regulation number), the flow advances to the JAMSUB and the operation of the RDF is stopped (step 003).

Step 003 can also detect if the partition arm 22 does not rotate due to failure of the recycle motor or the recycle sensor. Thus, the operation of the RDF can be immediately stopped in this case as well.

When the operator stacks originals not abutting against the side wall 1a as shown in FIG. 10-4, defective setting of originals occurs. In this case, in step 001, the motor ON timer is used to drive the motor for a period of time longer than the required rotation time for setting the partition arm 22 on the originals. For this reason, in the state shown in FIG. 10-4, a so-called free rotation occurs. The recycle sensor (RS) 19 detects two or more ON/OFF operations during rotation of the motor. Then, the operation of the RDF is stopped due to defective setting of originals (step 004).

Figure 13:
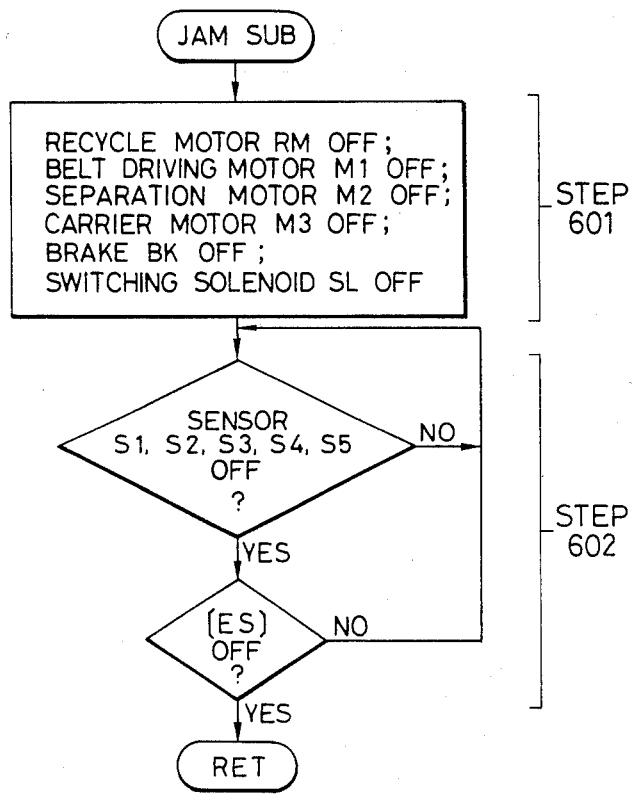

When the original reaches the predetermined position on the glass platen 12, the cycle end SUB is executed. This subroutine is executed before each original stops on the glass platen. In the cycle end SUB shown in FIG. 12, the original number counter is incremented by one and it is checked if the count of the counter is more than the regulation number. If YES, the flow advances to the JAMSUB to be described later, and the operation of the RDF is stopped (step 501). With this arrangement, even when the partition arm 22 does not drop by its own weight for some reason, the operation of the RDF will not be continued after a predetermined number of originals have been copied. As the copy operation proceeds, the copied originals are sequentially stacked on the remaining originals, i.e., on the arm 22. When the original which was at the top of the originals in the initial state is fed to the glass platen 12, one circulation of originals has been completed, and there are no more originals below the arm 22. Therefore, the partition arm 22 passes through the notch 28 and is pivoted in the direction indicated by the arrow in FIG. 10-2 by its own weight. The arm 22 is then stopped at the position 22' and is detected by the recycle sensor (RS) 19 which supplies a one circulation end signal to the copying machine (step 502). Thus, the operation of the recycle count device is reliably performed. The JAMSUB operation for stopping the operation of the RDF will be described with reference to FIG. 13.

The recycle motor RM, the belt driving motor M1, the separation motor M2, the carrier motor M3, the brake BK, and the switching solenoid SL are all turned off and the operation thereof is stopped (step 601). It is then checked if the sensors S1, S2, S3, S4 and S5 are all off so as to ascertain if all the originals on the paper paths have been removed. It is also checked if the ES sensor is OFF so as to ascertain if the operator has removed the originals, and thereby releasing the jam state (step 602).

When such a trouble is detected, it can be displayed by a proper indication/display means.

Although the present invention has been described with reference to the case of an RDF, the present invention is not limited to this and can be similarly applied to original handling apparatuses other than apparatuses of original circulation type.

What is claimed is:

1. An original handling apparatus comprising:
   stacking means for stacking a bundle of originals;
   feeding means for separating the originals stacked on said stacking means one and for feeding the separated original;
   detecting means for detecting the thickness of the bundle of originals stacked on said stacking means; and
   control means for identifying over-stacking of the originals based on an output from said detecting means at the time when an operation of said feeding means is initiated, and for inhibiting the operation of said feeding means if the over-stacking of the originals is identifed.

2. An apparatus according to claim 1, wherein said feeding means further comprises circulating means for separating each original from the bundle or originals on said stacking means, feeding the separated original to an exposure position, removing the original from the exposure position after being exposed, and returning the exposed original onto said stacking means.

3. An apparatus according to claim 2, wherein said circulating means further comprises partitioning means, set on the bundle of originals stacked on said stacking means, for indicating one circulation of the originals.

4. An apparatus according to claim 3, wherein said detecting means is responsive to said partitioning means being placed on the bundle of originals, so as to detect if the bundle thickness is greater than a predetermined thickness.

5. An apparatus according to claim 4, wherein said detecting means detects a position of said partitioning means set on the bundle of originals.

6. An apparatus according to claim 5, wherein said control means inhibits operation of said feeding means when said detecting means detects that the position of said partitioning means exceeds a predetermined position.

7. An original handling apparatus comprising:
   stacking means for stacking a bundle of originals;
   carry means for separating and feeding each original from said stacking means to an exposing position, removing the original from the exposure after being exposing and returning the exposed original onto said stacking means;
   detecting means for detecting one circulation of the bundle of originals, said detecting means including partitioning means, set on the bundle of originals stacked on said stacking means and a sensor for sensing said partitioning means;

drive means for driving said partitioning means for a predetermined period of time so as to set said partitioning means on the bundle of originals at the time when the operation of said carry means is initiated; and control means for inhibiting the operation of said carry means in the event that said sensor sensed said partitioning means a plurality of times during said predetermined period of time.

8. An original handling apparatus comprising:

stacking means for stacking a bundle of originals;

carry means for separating and feeding each original from said stacking means to an exposure position, removing the original from the exposure position and returning the exposed original to said stacking means;

detecting means for detecting one circulation of the bundle of originals;

count means for counting each time an original is fed by said carry means from said stacking means; and control means, responsive to said count means and said detecting means, for controlling said carry means, wherein said control means stops the operation of said carry when the exceeds a predetermined number and said detecting means has not detected one circulation of the bundle of originals, and wherein the predetermined number corresponds to a maximum number of originals which can be stacked on said stacking means.

* * * * *

UNITED STATES PATENT AND TRADEMARK OFFICE
CERTIFICATE OF CORRECTION

PATENT NO. : 4,723,772
DATED : February 9, 1988
INVENTOR(S) : TAKESHI HONJO, ET AL.

It is certified that error appears in the above-identified patent and that said Letters Patent is hereby corrected as shown below:

COLUMN 2

Line 23, "orinqinal" should read --original--.

COLUMN 3

Line 37, "sided" should read --Side--.
Line 39, "side" should read --sided--.
Line 66, "simple simple" should read --a simple--.

COLUMN 4

Line 11, "shown) the" should read --shown) of the--.
Line 14, "sides" should read --sided--.

COLUMN 5

Line 26, "01 to 08" should read --01 to 08--.
Line 28, "04" should read --04--.
Line 29, "05" should read --05--.
Line 33, "02 and 03" should read --02 and 03--.

COLUMN 7

Line 7, "electromagentic" should read --electromagnetic--.
Line 67, "ocunt" should read --count--.

COLUMN 8

Lines 2-3, "electro-magnetic" should read --electromagnetic--.

UNITED STATES PATENT AND TRADEMARK OFFICE
CERTIFICATE OF CORRECTION

PATENT NO. : 4,723,772

DATED : February 9, 1988

INVENTOR(S) : TAKESHI HONJO, ET AL.

It is certified that error appears in the above-identified patent and that said Letters Patent is hereby corrected as shown below:

COLUMN 10

Line 24, "one" should read --one by one--.
Line 37, "or" should read --of--.
Line 62, "exposing" should read --exposure--.
Line 63, "exposure" should read --exposure position--.

COLUMN 12

Line 11, "carry when the" should read --carry means when the count--.

Signed and Sealed this

Seventh Day of February, 1989

Attest:

DONALD J. QUIGG

*Attesting Officer*  *Commissioner of Patents and Trademarks*